Jan. 15, 1957  J. W. FRIED  2,777,342
DEBURRING, CHAMFERING, COUNTERSINKING TOOL
Filed April 23, 1954  2 Sheets-Sheet 1
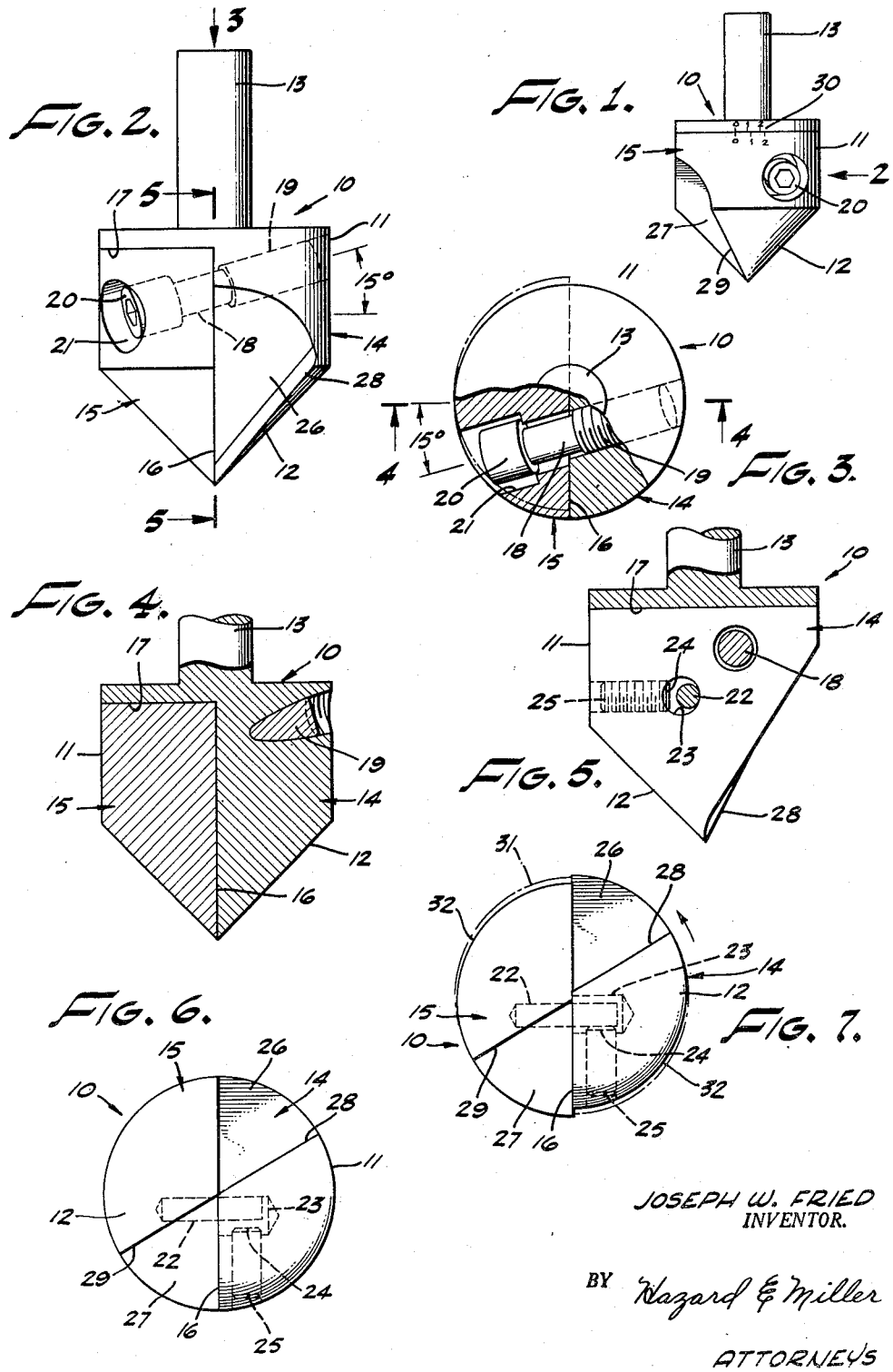
JOSEPH W. FRIED
INVENTOR.
BY Hazard & Miller
ATTORNEYS Jan. 15, 1957 J. W. FRIED 2,777,342
DEBURRING, CHAMFERING, COUNTERSINKING TOOL
Filed April 23, 1954 2 Sheets-Sheet 2
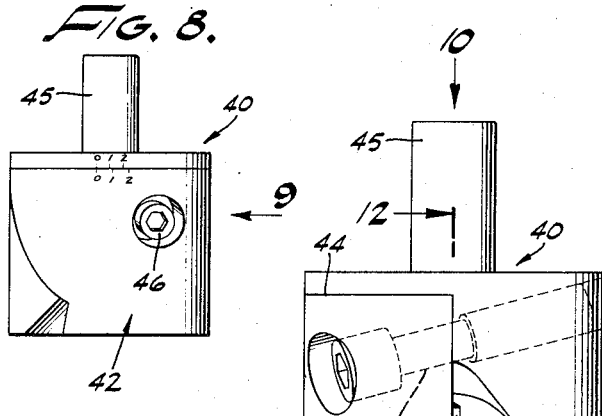
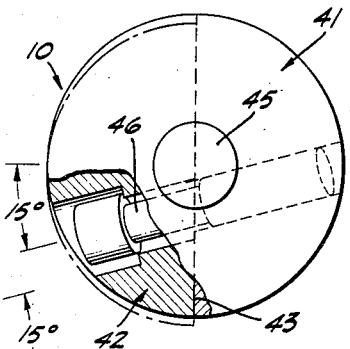
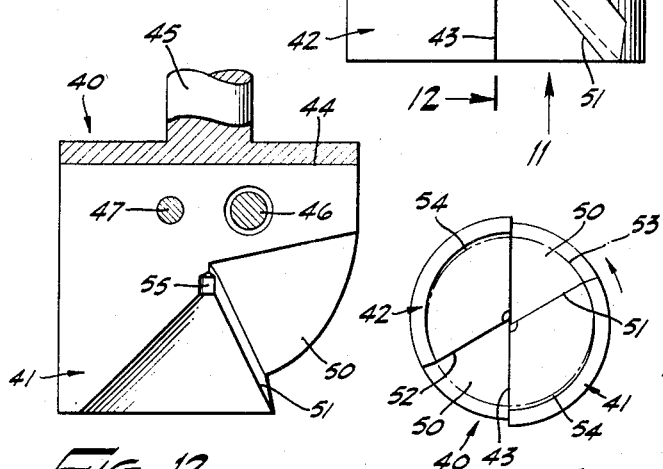
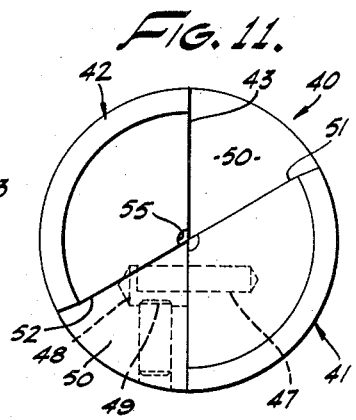
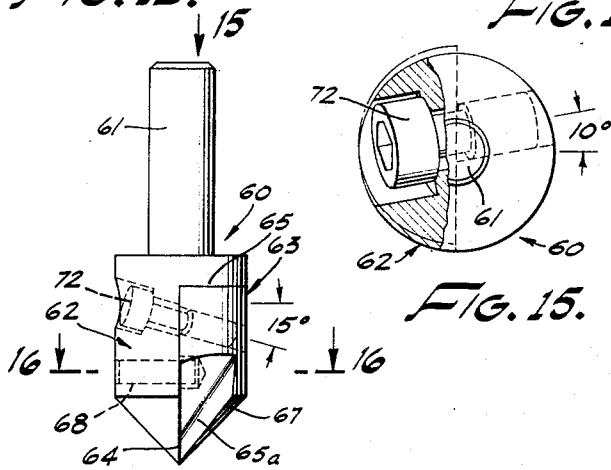
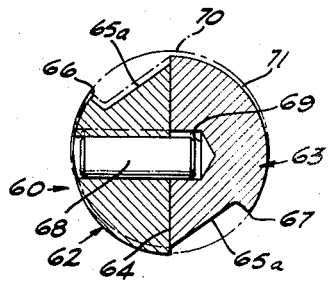
JOSEPH W. FRIED
INVENTOR.
BY Hazard & Miller
ATTORNEYS

United States Patent Office 2,777,342
Patented Jan. 15, 1957

2,777,342

DEBURRING, CHAMFERING, COUNTERSINKING TOOL

Joseph W. Fried, Burbank, Calif.

Application April 23, 1954, Serial No. 425,233

2 Claims. (Cl. 77—73.5)

This invention relates to a tool for performing hole deburring, chamfering, countersinking, taper reaming, and similar operations. In deburring and chamfering operations, it is usually desired to remove a relatively small amount of metal from around the edges of a hole or around the end of a cylindrical rod. Where such relatively small amounts of metal are to be removed it is frequently advantageous to have the tool mounted on a spindle of a drill press and to transfer the work manually to the tool without resorting to work holding devices, such as clamps, jigs, or the like. Where the work is in the form of small parts of relatively light weight, production can be considerably increased if the operator merely holds the work against the revolving cutter without even resorting to the depositing of the work on the drill press table.

Existing conventional countersinks which have been designed for heavier stock removal have sometimes been used for deburring and chamfering operations. Usually, however, the use of such conventional countersinks for this purpose has been objectionable due to the fact that as the cutting edges of such countersinks were designed for heavier stock removal they produce an undesirable chatter finish when the work is only held lightly thereagainst in attempting to prevent or limit excessive removal of stock. Furthermore, if the countersink has the usual three or more cutting edges with a relatively heavy depth of cutting edge engagement with the work piece a torque may be developed which is in excess of the operator's ability to manually hold the work piece against the countersink.

A primary object of the present invention is to provide an improved tool which can be adjusted to establish the most desirable depth of cut to be taken by the cutting edge for the particular operation that is to be performed. Thus, if a deburring or chamfering operation is to be performed the tool may be so adjusted that the projection of its cutting edges is relatively small, restricting the rate of entry and, consequently, having a relatively small chip throat. Where countersinking, taper reaming, or similar operations are to be performed the tool may be adjusted to establish the optimum conditions for these operations wherein there will be a heavier penetration of the cutting edge into the working end; consequently, a heavier chip throat.

Another object of the invention is to provide a tool having the above-mentioned characteristics and which is highly advantageous in that the tool can be easily and quickly reground and sharpened as occasion may require without requiring the use of special relief grinding attachments or complex grinding set ups.

A still further object of the invention is to provide a tool having the above-mentioned characteristics which is so designed as to provide broad or relatively deep chip throats in advance of the cutting edges which are comparatively broad and deep close to the point of the tool.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of one form of tool embodying the present invention;

Fig. 2 is a view in side elevation of the tool taken in the direction of the arrow 2 upon Fig. 1, and showing the tool on a somewhat enlarged scale;

Fig. 3 is a top plan view taken in the direction of the arrow 3 upon Fig. 2, parts being broken away and shown in section;

Fig. 4 is a sectional view taken substantially upon the line 4—4 upon Fig. 3;

Fig. 5 is a sectional view taken substantially upon the line 5—5 upon Fig. 2;

Fig. 6 is a bottom plan view of the tool shown in Figs. 1–5 and in that position assumed by the tool when it is initially ground or is being reground;

Fig. 7 is a view similar to Fig. 6 but illustrating the tool as having been adjusted to perform deburring, chamfering, countersinking or taper reaming operations;

Fig. 8 is a view in side elevation of another embodiment of the invention utilized for performing external as distinguished from internal deburring, chamfering or countersinking operations;

Fig. 9 is a view in side elevation taken in the direction of the arrow 9 upon Fig. 8 on a somewhat enlarged scale;

Fig. 10 is a top plan view taken in the direction of the arrow 10 upon Fig. 9, parts being broken away and shown in section;

Fig. 11 is a bottom plan view of the tool shown in Fig. 9 and may be regarded as having been taken in the direction of the arrow 11 on Fig. 9, the tool being shown in that position wherein it is initially ground or reground;

Fig. 12 is a vertical section taken upon the line 12—12 upon Fig. 9;

Fig. 13 is a view on a somewhat smaller scale than Fig. 11 but illustrating the tool as having been adjusted to perform its external deburring, chamfering, or beveling operations;

Fig. 14 is a view in side elevation of still another embodiment of the present invention;

Fig. 15 is a top plan view taken in the direction of the arrow 15 upon Fig. 14, parts being broken away and shown in section; and Fig. 16 is a horizontal section taken upon the line 16—16 upon Fig. 14 and illustrating in dotted lines the position assumed by parts of the tool when adjusted to perform cutting operations.

Referring to the accompanying drawings wherein similar reference characters designate similar parts throughout, and referring first to that form of construction illustrated in Figs. 1–7, the improved tool consists of a body, generally indicated at 10, the upper portion of which is externally cylindrical, as indicated at 11, and the lower portion of which is generally conical, as indicated at 12. At the top of the body there is an upstanding shank 13 by which the tool may be rotated, such as by the chuck on a drill press. The axis of the shank 13 and the axes of the cylindrical portion and the conical portion on the body are initially coincident with each other.

The body 10 may be regarded as having been divided into two parts, that is, it is made up of two parts that are mutually complementary to each other. One part which is integral with the shank 13 is of inverted L-shaped cross section, such part being indicated at 14 on Fig. 4. The complementary part is indicated at 15. These parts abut against each other on a diametrical plane indicated at 16, and the part 15 also abuts against a horizontal shoulder 17 preferably arranged on a plane at right angles of the axis of the shank 13. The two parts are held together in assembled relationship by a bolt 18, the threaded portion of which, indicated at 19, threadably engages a tapped hole in the body part 14.

The head of this bolt, indicated at 20, is recessed in the body part 15 and fits rather loosely in the hole 21 extending therethrough. The axis of the bolt 18 is preferably arranged so that it is inclined at approximately 15° to a horizontal plane extending through the body 10 as depicted in Fig. 2. It is also inclined to a diameter at right angles to the plane 16 by approximately 15° as shown on Fig. 3. In the head of the bolt 20 there is a hexagonal recess to receive the end of a wrench by which the bolt 18 may be loosened or tightened.

On the body part 15 there is a dowel pin 22 which extends loosely into a hole 23 formed in the face on the plane 16. This dowel is consequently laterally movable in the hole 23 but may have its movement limited by an adjustable stop 24 that is provided by a set screw 25, the head of which is accessible from the exterior of the body part 14.

From the plane 16 each body part is rebated or cut away, as indicated at 26 and 27, to form or define chip throats which are immediately in advance of and which define cutting edges 28 and 29. These cutting edges are located somewhere in the quadrant, one side of which is defined by the plane 16. Preferably, the angular relationship between the cutting edges 28 and 29 and the plane 16 is approximately 60°, but this angular relationship may be varied considerably.

When the parts 14 and 15 of the tool are initially formed and are assembled together the part 15 is caused to slide relatively to the part 14 on the plane 16 until the cylindrical surfaces 11 and the conical surfaces 12 on the two parts are substantially flush with each other. In this position the dowel 22 will normally be abutting against one side of the hole 23 as shown in Fig. 6. In this position the bolt 18 is thoroughly tightened to hold the parts in mutually assembled relationship and due to the inclination of the bolt above the horizontal, as previously explained, the tightening of the bolt will tend to draw the part 15 firmly against the shoulder 17. In this position of the body parts the shank 13 may be chucked into any conventional form of cylindrical grinder and rotated and the conical surfaces 12 on the two parts 14 and 15 can be easily and accurately ground to conform to a true cone or other desired surface of revolution whose axis is coincident with that of the shank 13. The same operation may be performed in regard to grinding the tool either for sharpening purposes or for modification.

After the tool has been thus ground the bolt 18 can be loosened and the part 15 can be displaced laterally into the position shown in Fig. 7. The amount of lateral displacement is limited or governed by the position of the stop 24 provided by the set screw 25. If desired, this may be indicated by graduation marks on the two body parts which are indicated at 30. See Fig. 1. When this lateral displacement occurs, it will be observed that the outer ends of the cutting edges 28 and 29 are disposed on a circle 31 that is slightly greater than the initial circle on which these ends of the cutting edges were disposed as depicted in Fig. 6. Consequently, any two horizontally even points on the cutting edges 28 and 29 will also be disposed on a circle slightly greater than the initial circle on which these points were ground during the grinding operation. In effect, this causes the cutting edges to slightly protrude with relation to the heel surfaces behind the cutting edges, it being assumed that the tool when driven is rotated toward the right or in a clockwise direction when looking down on the tool. Such relief is indicated by the space 32 between the circle 31 and the surface of the body part.

The displacement is illustrated in a somewhat exaggerated manner on the drawing for purposes of clarity, it being understood that in the usual situation the displacement is in the neighborhood of about .002" for deburring purposes and up to .006" for countersinking purposes. The true axis of the body under these circumstances would be displaced, respectively, .001" and .003". No attempt is made to realign the driving shank 13 with relation to the new axis of the body inasmuch as the runout is negligible. Also inaccuracies of equal or greater amounts are commonly encountered with the chucking and driving spindle assemblies on drill presses and the like on which these tools are commonly employed. If precision workmanship is required adjustable tool holders may be employed.

It will be observed from the above described construction that as the chip throat is formed by rebating or removing a portion of a body part from the plane 16 rearwardly to the cutting edge 28 or 29, as the case may be, that the chip throat may be relatively broad and adequately deep down to the external point of the tool. Consequently, if the tool is used in deburring or countersinking around the edges of very small holes a chip throat of adequate size is provided to handle all chips that may be removed. This is of considerable advantage in a tool of this character in that most countersinking tools are incapable of having a chip throat of adequate size very close to the point.

Due to the angular position of the bolt 18 both with respect to the horizontal and with respect to the diameter that is at right angles to the plane 16, the tightening of the bolt tends to draw the part 15 firmly against the shoulder 17 and to cause the part 15 to slide laterally with respect to the body part 14 until the dowel 22 engages the stop 24. During operation of the tool reactionary forces effective on the body part 15 tend to return this part from the position shown in Fig. 7 to the position shown in Fig. 6. This return, however, is effectively prevented by the wedge-shaped body of metal between the head 20 on the bolt 18 and the plane 16. Consequently, as long as the bolt remains tight return of the part 15 from the position shown in Fig. 7 to the position shown in Fig. 6 by reaction with the work is effectively prevented.

In Figs. 8–13 inclusive the same principles of the invention have been applied to a tool designed to externally debur or chamfer or bevel the edge of a rodlike work piece. In this form of construction the body 40 is made up of two complementary parts 41 and 42 divided from each other on a diametrical plane 43 and on a horizontal plane 44. The part 41 has integral therewith the shank 45. The two parts are held in mutually assembled relation by the bolt 46 which has the same angular relationship to the horizontal and to a diameter at right angles to the plane 43, as previously explained. In this form of construction, one of the body parts has a dowel 47 that loosely extends into a hole 48 in the other body part and is engageable by the stop 49 provided by a set screw. In this form of construction each body part is rebated rearwardly from the diametrical plane 43, as indicated at 50, to define cutting edges 51 and 52 which are spaced rearwardly from or are remote from the diametrical plane 43. These cutting edges are located on an internal conical surface or other surface of revolution which initially has its axis coincident with the axis of the shank 45. In the course of the initial grinding or in regrinding, the tool may be mounted on a cylindrical grinder by means of its shank 45 with the parts assembled together in the position shown in Fig. 11. The internal conical surface may then be ground on the two parts after which the part 42 is displaced laterally and caused to assume the position shown in Fig. 13. In this position the outer ends of the cutting edges 51 and 52 will be disposed on a circle 53 slightly smaller than the initial circle on which these cutting edges were ground. Consequently, any two horizontally even points on the cutting edges 51 and 52 will be arranged on a somewhat smaller circle than the initial circle. The relief or heel clearance is indicated at 54, this being the space between the circle 53 and the internal curvature of the body parts. In this form of construction it is likewise possible to have a relatively broad and deep chip throat near the point where the cutting edges meet near the center of the tool. Usually a small recess 55 is formed in the two parts at the very center of the tool.

In the construction shown in Figs. 14, 15 and 16, the same principles are applied wherein the body, generally indicated at 60, has a shank 61 integral with the body part 62 which is divided from the body part 63 on a diametrical plane 64 and a horizontal plane 65 providing the downwardly facing shoulder. In this form of construction the two body parts are rebated from the diametrical plane rearwardly to provide the chip throats 65a defining the cutting edges 66 and 67. In this form of construction the dowel 68 extends into the recess or hole 69 loosely but is not engaged by an adjustable stop or set screw. This type of tool is used primarily for deburring and chamfering operations only and the hole 69 is so arranged that when one side of the hole is engaged by the dowel 68 the two parts are in alignment with each other for purposes of grinding and when the dowel engages the other side of the hole 69 one part 63 is fully displaced with respect to the other body part 62. In this position the cutting edges 66 and 67 are located on the cutting circle 70 and the relief or heel clearance appears as indicated at 71. The bolt 72 in this form of construction is preferably arranged at 15° to the horizontal so that on tightening the bolt the part 63 will be drawn tightly against the downwardly facing shoulder at 65. However, the angular relationship of the bolt 72 to the diameter that is arranged at right angles to the plane 64 is reduced to 10°. In this form of construction it is undesirable to have the bolt dray the part 63 laterally on tightening, it being preferred that when the part 63 has been fully displaced that it remain in its fully displaced position without disturbance occasioned by the tightening of the bolt. When in the displaced condition the wedge of metal between the head of the bolt and the diametrical plane is effective to resist collapse on the tool or the return of the part 63 to an aligned position with the part 62 under the influence of reactionary forces developed in the course of cutting.

It will be appreciated from the above described construction that the improved tool can be easily and economically manufactured and assembled and that it may be ground and reground very easily on conventional cylindrical grinders. The degree of displacement can then be carefully adjusted or controlled so that the cutting edges will not unnecessarily bite into the work and produce a chatter finish in the course of deburring and chamfering. At the same time it is possible to so adjust the tool that a heavier cut may be taken in countersinking and taper reaming operations.

In all forms of construction as one side of the chip throat terminates on the diametrical plane on which one body part is laterally displaced or caused to slide relatively to the other the chip thoat may be made relatively broad and deep. Opportunity is also afforded by reason of this form of construction to develop the proper or desired rate for the cutting edge and to so form the chip throat as to impart to the cutting the desired curl. This enables the chip throat to be also properly formed very close to the center of the tool and to be of adequate size.

In all of the forms of construction above described it will be appreciated that the conical surface is circularly ground when the tool is either being initially constructed or it is being re-sharpened. The sections of the body are then offset with respect to each other providing two cutting edges located on an expanded diameter and corresponding surface of revolution. In so doing, there is automatically developed a condition which is very important in securing uniform and chatter-free operation of the tool. This resides in the fact that the reliefs developed behind the cutting edges are in absolute diametrical symmetry throughout their arcs with respect to the mentioned surface of revolution. This radial relief or heel clearance is the principal factor controlling the rate at which the cutting edges may enter the work. Each cutting edge can enter the work only to the extent or freedom of relief afforded behind the cutting edge. When two or more cutting edges are provided it is important that these relief conditions be absolutely uniform so that each cutting edge performs uniform entry into the work and the work load may be identically balanced or distributed between the cutting edges. It is desirable that each cutting edge exert an equal and identical action on the work with that of the other cutting edge so that there will occur an equal and identical reactive force on the cutting edges and on the body of the tool. This equal distribution prevents development of a chatter or rough-work finish inasmuch as when the load is not balanced, vibration is developed in the tool in endeavoring to establish equilibrium between the cutting edges.

It should further be noted that radial relief changes with the adjustment of the tool, increasing in proportion with the increase of displacement. Thus the greater the displacement the greater the relief or heel clearance. Seating surfaces occur rearward of each cutting edge in contact with the cutting paths that are being established. The rate of relief is adjustable with the adjustment of the tool, increasing in proportion with increased displacement between the cutting edges. Inasmuch as the relief surfaces control the permissible maximum rate of entry of the cutting edges into the work the relief or heel clearance for each class of work or material type can be established for best advantage.

Various changes may be made in the details of construction without departing from the spirit and scope of the invention as defined by the appended claims.

I claim:

1. A tool of the class described comprising a body having an axial shank thereon by which the body may be rotated, said body having a conical surface of revolution formed thereon the axis of which is coincident with the axis of the shank, the body being divided on a diametrical plane into two parts one of which is movable laterally on said plane relatively to the other, there being a chip throat on each part one side of which terminates in an edge on said surface of revolution spaced from said diametrical plane, whereby when one part is displaced laterally to the other said edges will be located on surfaces of revolution slightly different from the mentioned surface of revolution and can consequently function as cutting edges, and means for holding the parts of the body in said laterally displaced position, comprising a bolt extending through one part and threaded into the other said bolt being on an axis inclined other than at right angles to said diametrical plane and other than parallel to a diameter at right angles to said diametrical plane.

2. A tool of the class described comprising a body having an axial shank thereon by which the body may be rotated, said body having a conical surface of revolution formed thereon the axis of which is coincident with the axis of the shank, the body being divided on a diametrical plane into two parts one of which is movable laterally on said plane relatively to the other, there being a chip throat on each part one side of which terminates in an edge on said surface of revolution spaced from said diametrical plane, whereby when one part is displaced laterally to the other said edges will be located on surfaces of revolution slightly different from the mentioned surface of revolution and can consequently function as cutting edges, and means for holding the parts of the body in said laterally displaced position, comprising a bolt extending through one part and threaded into the other said bolt being on an axis inclined other than at right angles to said diametrical plane and other than parallel to a diameter at right angles to said diametrical plane, a dowel on one of said parts extending loosely into a recess in the other of said parts and an adjustable stop on said other of said parts engageable by the dowel.

References Cited in the file of this patent

UNITED STATES PATENTS

| | | |
|---|---|---|
| 111,085 | Reaney | Jan. 17, 1871 |
| 2,317,615 | Johnson | Apr. 27, 1943 |
| 2,367,560 | Boland | Jan. 16, 1945 |